United States Patent [19]

Schmeisser

[11] 4,015,097

[45] Mar. 29, 1977

[54] ELECTRICAL CONTACT CONSTRUCTION

[75] Inventor: Manfred Schmeisser, Amberg, Germany

[73] Assignee: Siemens Aktiengesellschaft, Munich, Germany

[22] Filed: May 21, 1975

[21] Appl. No.: 579,545

[30] Foreign Application Priority Data

May 27, 1974 Germany ............................ 2425490

[52] U.S. Cl. ................................................ 200/275
[51] Int. Cl.² ............................................ H01H 1/06
[58] Field of Search .......... 200/275, 278, 279, 238, 200/263, 267, 268, 269

[56] References Cited

FOREIGN PATENTS OR APPLICATIONS 1,038,160  9/1958  Germany ............................ 200/275

Primary Examiner—Herman J. Hohauser
Attorney, Agent, or Firm—Kenyon & Kenyon Reilly Carr & Chapin

[57] ABSTRACT

An electrical contact for an electric switching apparatus which includes a contact carrier and contact overlay soldered to one of the surfaces of the carrier. The improvement of the invention comprises at least one longitudinal slot disposed in the contact along the arc travel direction thereof which forms a blind hole in the contact open at the end thereof along the arc travel direction.

5 Claims, 2 Drawing Figures

ELECTRICAL CONTACT CONSTRUCTION

BACKGROUND OF THE INVENTION

1. FIELD OF THE INVENTION

This invention relates to an improved electrical contact construction for an electrical switching apparatus of the type in which a contact overlay is soldered to a contact carrier.

2. DESCRIPTION OF THE PRIOR ART

Electrical contacts of the above-described type are generally known in the art. Generally speaking, when the parts of such contacts are soldered together, faults are produced between the contact carrier and the contact overlay, especially if the solder utilized is continuously supplied. Such faults can be reduced in number by inserting prefabricated (for example, rolled) solder layers between the contact carrier and the contact overlay prior to soldering, but such a solution is relatively expensive. Moreover, the contact carrier and the contact overlay of the contact can be soldered together with continuously supplied solder only for small gap depths, e.g., two to three millimeters. Otherwise, a satisfactory degree of filling is not obtained. If solder joints of a large area are filled either by manually supplying the solder or by applying preformed solder parts from the outside, poor filling, and faults, result. This occurs, since at the beginning of the soldering process, the solder penetrates uniformly into the work piece. As the soldering progresses, however, the soldering front lags in the interior of the solder joint. In the final stages of the process, the solder reaches at the lateral edges thereof the edges of the contact overlay which are to be soldered to the carrier, and then flows along the edges of the overlay and closes the solder gap. Flux which remains in the interior of the solder joint then cannot escape to the outside of the joint, and accordingly forms a major occlusion. This adversely effects the strength of the solder joint, and in electrical contacts, results in increased burn-off losses due to arc stabilization.

SUMMARY OF THE INVENTION

It is therefore an object of the present invention to provide an improved electrical contact for an electric switching apparatus which overcomes the aformentioned disadvantages of heretofore known electrical contacts.

It is also an object of the present invention to provide an improved electrical contact for use in low-voltage, high-power circuit breakers in which faults in soldering are reduced to a minimum.

These and other objects are achieved in an electrical contact for an electric switching apparatus of the type in which the contact includes a contact carrier and a contact overlay soldered to one of the surfaces of the carrier. The improvement of the invention comprises the provision of at least one longitudinal slot which is disposed along the arc travel direction of the contact and forms a blind hole therein open at the end thereof along the arc travel direction.

The advantage of such an arrangement is that during the soldering process a degassing canal is formed which permits gas occlusions (which cause the soldering faults) to escape over the largest possible area of the contact. A U-shaped current feed-in is formed for the contact by the slot and, as a result, the arc travel is improved and stabilization of the arc at the fault locations (a condition which results from feeding current in circularly to the contact overlay around the faults) is prevented. The overall advantage of the inventive arrangement is that less burn-off is obtained for maximum switching power and continuous operation.

If the slot is provided in an extension of the contact carrier to which an arc guide plate is soldered, as is described later on herein, separate exhaust openings for degassing the solder need not be provided. In addition, it is preferably that the width of the slot be about one third the total width of the contact to maximize the advantages obtained by the inventive arrangement. Finally, since the contact must be bolted on, a hole for mounting the contact is required. Separately milling out of the slot can be dispensed with if the slot is formed by two or more blind holes; in one embodiment of the inventive arrangement, the slot accordingly can be provided in one operation during formation of the mounting holes for the contact.

These and other features of the invention will be described in greater detail in the following detailed description.

DETAILED DESCRIPTION

Figure 1:
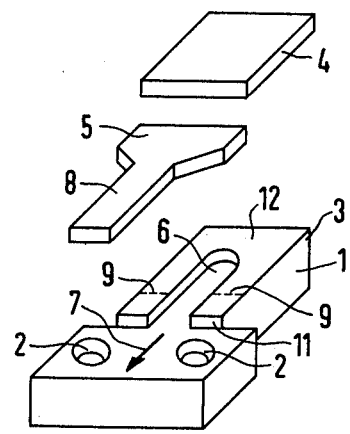
FIG. 1 is an exploded, prospective view of an improved electrical contact constructed according to the invention.

Referring now to the drawings, and in particular to FIG. 1, there is shown a contact carrier 1 having a pair of mounting holes 2, for fastening the carrier in an electrical switching apparatus, disposed at the end of the carrier from which current for the contact is fed in. A contact overlay 4, and an arc guide plate 5 (which is preferably fabricated of iron), are soldered (by, for example, silver solder) on a narrow projection portion 3 of the contact carrier. A longitudinal slot 6 is provided in the contact, either in the contact carrier or the contact overlay, and in the assembled condition of the latter, contact overlay 4 and arc guide plate 5 cover the slot so that a canal is formed between the overlay and contact carrier within the contact. Slot 6 forms a blind hole in the contact which is open at the end thereof along the arc travel direction (designated by the arrow 7). Direction 7 corresponds to the traveling direction of the arc, and plate 5 is accordingly provided with an extension 8 onto which the arc runs. Current is fed into the contact through edge regions 9 of the carrier which form a boundary around slot 6 to the extent overlay 4 is soldered to contact carrier 1. Transmission of the current into the contact in a U-shape causes the arc to be centered towards the center of the contact, which produces acceleration of the arc travel in the direction towards extension 8.

Figure 2:
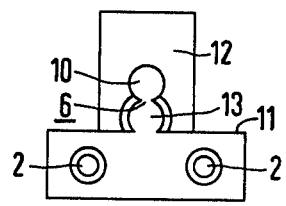
FIG. 2 is a top, plan view of the contact carrier of another embodiment of an electrical contact constructed according to the invention.

FIG. 2 illustrates another embodiment of the invention in which slot 6 is formed by a blind hole 10 comprising the edge of the slot, and a countersunk hole 13 which couples hole 10 with the front edge 11 of projecting portion 12 of the contact carrier. Formation of the holes in this embodiment of the contact can be carried out without the requirement of a separate operation, since mounting holes 2 are also countersunk. The contact overlay and the arc guide plate are soldered to the contact carrier shown in FIG. 2 in the same manner as in the embodiment illustrated in FIG. 1. It should be noted that the depth of slot 6 in contact carrier 1 must be large enough in either embodiment to assure that the degassing canal formed is not clogged by the solder during the soldering operation.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimes is:

1. In an electrical contact for an electric switching apparatus, said contact including a contact carrier and a contact overlay soldered to one of the surfaces of said carrier, the improvement comprising said contact including at least one longitudinal slot disposed therein between said contact carrier and said contact overlay along the arc travel direction of said contact for forming a blind hole in said contact, said blind hole being open at the end thereof along said arc travel direction and forming a canal between said contact carrier and said contact overlay within said contact which is open at one end thereof.

2. The electrical contact recited in claim 1, wherein said slot is disposed in said one of said surfaces of said contact carrier to which said overlay is soldered and forms a U-shaped boundary around said slot in said contact carrier.

3. The electrical contact recited in claim 2, wherein said contact carrier includes an outwardly extending projection portion, said slot being disposed in said portion, and said contact overlay being soldered to said portion over said slot, and wherein said contact further comprises arc guide plate means soldered to said contact carrier portion adjacent said contact overlay and over said slot.

4. The electrical contact recited in claim 2, wherein the width of said slot is approximately one third the width of said contact.

5. The electrical contact recited in claim 2, wherein said slot comprises a plurality of adjacent holes disposed in said one of said surfaces of said contact carrier to which said contact overlay is soldered.

* * * * *